Patented Feb. 17, 1931

1,792,903

UNITED STATES PATENT OFFICE

LUDWIG HALLER, OF STUTTGART, GERMANY

MORTAR FOR DENTAL PURPOSES

Application filed June 10, 1929, Serial No. 369,779, and in Germany May 10, 1929.

This invention relates to a mortar for dental purposes which has on its lower surface a rubber ring to prevent slipping on the support. In order to ensure a secure hold of the rubber ring on the mortar, the latter has a groove of suitable shape and with a projecting edge. The rubber ring has a corresponding feather engaging with the groove in the mortar and bearing against the projecting edge of the mortar. The diameter of the groove is greater than the diameter of the mortar proper.

The bearing surface of the rubber ring is of such shape that the plane of contact between the rubber ring and the support is very small and any danger of slipping even on a moist or wet surface is excluded. The rubber ring fits tightly on the mortar, however without being tensioned.

Owing to this construction of the mortar and of the rubber ring it does no longer happen that the mortar to be used has to be held with one hand, which is very fatiguing, the mortar according to the invention remaining in its position even at the strongest pounding and braying. It is therefore possible to use the free hand during the braying for adding substances to the material in the mortar. A further advantage is the special construction or fixation of the rubber ring preventing that the rubber ring looses its elasticity or is bent or pushed away from the mortar at very strong pressure.

A mortar according to the invention is illustrated by way of example, in the accompanying drawing in which.

Figure 1:
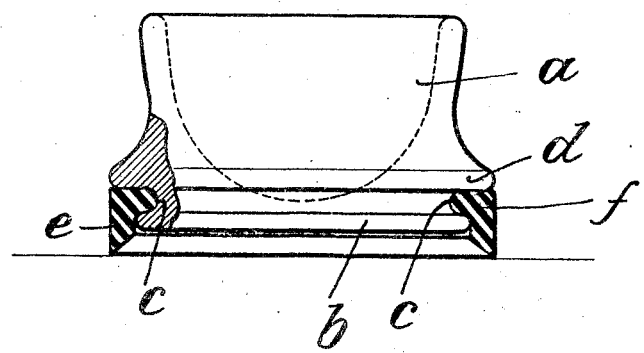
Fig. 1 shows in side elevation partly in section a mortar with rubber ring.
Figure 2:
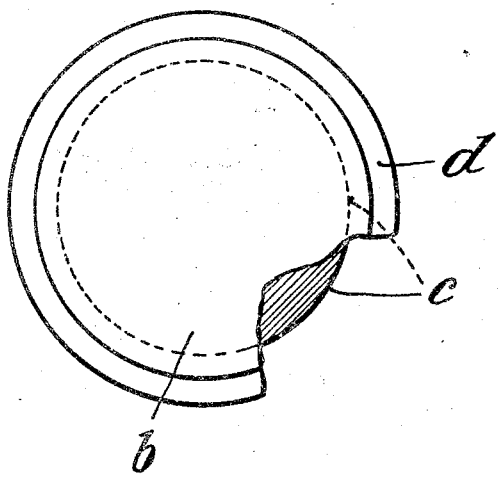
Fig. 2 is a plan view of the mortar viewed from below, the rubber ring being removed.

The mortar $a$ has on its foot $b$ a rubber ring $e$. This rubber ring $e$ has on its inner surface a feather $f$ engaging with a groove $c$ in the mortar. The feather $f$ fits tightly into the groove $c$ without being put under tension. An outwardly projecting flange $d$ of the mortar protects the rubber ring $e$. The lower surface of the rubber ring is bevelled so that its outer edge forms a contacting surface of the width of a line and the mortar is well secured on its support.

The mortar may be of any desired construction.

The rubber ring is specially useful on mortars with central pin, as these otherwise very practical motars rotate at the pounding and braying and have the tendency to tip over.

The rubber ring may be of any desired dimension in accordance with the mortar on which it has to be fitted. Instead of a rubber ring a ring of other suitable material might be used.

I claim:—

1. A mortar for dental purposes having a circular groove in its foot part, a rubber ring on the foot end of the mortar, and a projecting flange on the mortar at the upper edge of said groove to protect the rubber ring.

2. A mortar for dental purposes having a circular grove in its foot part, a rubber ring on the foot end of the mortar, a feather projecting from the inner side of said rubber ring and engaging with said groove, and a projecting flange on the mortar at the upper edge of said groove to protect the rubber ring.

3. A mortar for dental purposes having a circular groove in its foot part and of greater diameter than the inner diameter of the mortar, a rubber ring on the foot end of the mortar, and a projecting flange on the mortar at the upper edge of said groove to protect the rubber ring.

4. A mortar for dental purposes having a circular groove in its foot part, a rubber ring on the foot end of the mortar, a feather projecting from the inner side of said rubber ring and engaging with said groove and bevelled on the lower surface to form a line-shaped contacting surface, and a projecting flange on the mortar at the upper edge of said groove to protect the rubber ring.

In testimony whereof I affix my signature.

LUDWIG HALLER.